United States Patent
Huang

(10) Patent No.: US 7,170,498 B2
(45) Date of Patent: Jan. 30, 2007

(54) COMPUTER SYSTEM PROVIDED WITH HOTKEYS

(75) Inventor: Hsiang-Yu Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 515 days.

(21) Appl. No.: 10/650,691

(22) Filed: Aug. 29, 2003

(65) Prior Publication Data

US 2004/0042166 A1 Mar. 4, 2004

(51) Int. Cl.
*G09G 5/00* (2006.01)

(52) U.S. Cl. .......................... 345/172; 710/67
(58) Field of Classification Search ............... 345/168, 345/169, 172; 341/22; 400/472; 705/25; 710/67
See application file for complete search history.

(56) References Cited

U.S. PATENT DOCUMENTS 6,243,079 B1* 6/2001 Liu ........................... 345/168
6,429,793 B1* 8/2002 Paolini ....................... 341/22
6,529,219 B1* 3/2003 Baik et al. ................... 715/827
2004/0042166 A1* 3/2004 Huang ......................... 361/683

* cited by examiner

*Primary Examiner*—Amr A. Awad
*Assistant Examiner*—Tom Sheng
(74) *Attorney, Agent, or Firm*—Rabin & Berdo, P.C.

(57) ABSTRACT

A method for implementing functions of hotkeys. The method includes the steps of asserting an SMI signal when an SMI event is detected, determining whether the SMI event results from one of the hotkeys being pressed, determining whether the OS is of a first or second type if the SMI event results from one of the hotkeys being pressed, reading a status value corresponding to the pressed hotkey and implementing one of the functions corresponding to the status value by the BIOS if the OS is of the first type, and reading the status value corresponding to the pressed hotkey and transferring the status value to the OS by the BIOS, and implementing one of the functions corresponding to the status value by the OS if the OS is of the second type.

20 Claims, 5 Drawing Sheets

COMPUTER SYSTEM PROVIDED WITH HOTKEYS

BACKGROUND OF THE INVENTION

1. Field of the Invention

The present invention relates to a computer system provided with hotkeys and particularly to a computer system capable of implementing hotkey functions.

2. Description of the Prior Art

FIG. 1 is a diagram showing a computer system provided with hotkeys. The computer system 100 of FIG. 1 includes a CPU 102 coupled to a bridge logic device 106 via a CPU bus. The bridge logic device 106 is sometimes referred to as a "North bridge" for no other reason than it often is depicted at the upper end of a computer system drawing. The North bridge 106 also couples to a main memory array 104 by a memory bus, and may further couple to a graphics controller 108 via an accelerated graphics port (AGP) bus. The North bridge 106 couples CPU 102, memory 104, and graphics controller 108 to the other peripheral devices in the system through a primary expansion bus (BUS A) which may be implemented as a peripheral component interconnect (PCI) bus or an extended industry standard architecture (EISA) bus. Various components that comply with the communications protocol and electrical requirements of BUS A may reside on this bus, such as an audio device 114, an IEEE 1394 interface device 116, and a network interface card (NIC) 118. The system may include more than one network interface, as indicated by NIC 119. These components may be integrated onto the motherboard or they may be plugged into expansion slots 110 that are connected to BUS A.

If other secondary expansion buses are provided in the computer system, as is typically the case, another bridge logic device 112 is used to couple the primary expansion bus (BUS A) to the secondary expansion bus (BUS B). Various components that comply with the communications protocol and electrical requirements of BUS B may reside on this bus, such as a hard disk controller 122, Flash ROM 124, and Super I/O controller 126. Slots 120 may also be provided for plug-in components that comply with the protocol of BUS B. Flash ROM 124 stores the system BIOS that is executed by CPU 102 during system initialization.

Super I/O controller 126 may include battery-backed CMOS memory for storing BIOS configuration parameters for system 100, and may further include a counter or a Real Time Clock (RTC). The RTC may be used to track the activities of certain components such as the hard disk 122 and the primary expansion bus, so that controller 126 can induce a sleep mode or reduced power mode after a predetermined time of inactivity. In order to support hotkey functions, the super I/O controller 126 may also include an embedded controller to detect the hotkey events and initiate a procedure for implementation of the hotkey functions.

FIG. 2 shows a conventional embedded controller. The embedded controller 1261 is disposed in the super I/O controller 126 and coupled between the keyboard 130 and south bridge 112. For example, when the keys Fn and F2 are pressed together, the keyboard 130 sends to the input terminals KBD_IN and GPE_IN of the embedded controller 1261 a corresponding scan code and a signal representing an interrupt event through the output terminals KBD_O and Fn_SMI respectively. The keyboard 130 is typically composed of a microprocessor, decoder, and a matrix of key switches. The microprocessor periodically monitors the matrix to detect whether a key is pressed. The address of the pressed key in the matrix is decoded by the decoder for generation of the corresponding scan code. Additionally, a logic circuit, such as an AND gate, detects whether a function key is pressed together with another key. When a function key is pressed together with another key, the logic circuit asserts a signal representing an interrupt event. The embedded controller 1261 transfers the scan code from the keyboard 130 to the south bridge 112 and asserts a signal input to the input terminal EXT_SMI of the south bridge 112 to initiate the procedure for the hotkey function. The procedure is implemented by the ASL code (ACPI source language code) stored in the BIOS.

FIG. 3 is a flowchart of a conventional method for implementing hotkey functions in a computer.

In step 31, the key Fn and F2 are pressed together so that a hotkey event occurs. The keyboard accordingly sends out corresponding scan codes and asserts the signal representing an interrupt event on the output terminals KBD_O and Fn_SMI respectively.

In step 32, the operating system stored in the hard disk 122 has been loaded into the CPU 100. The signal representing the interrupt event from the keyboard 130 results in an SMI command sent to the CPU 100, which temporarily stops all procedures currently implemented by the operating system.

In step 33, in cooperation with the embedded controller 1261, the CPU 100 loads the ASL code from the BIOS and implements the procedure thereof.

In step 34, the CPU 100 determines whether the interrupt event is a hotkey event. If so, the procedure proceeds to step 35; otherwise, the procedure of the ASL code is terminated and the CPU 100 returns to continue the procedures of the operating system previously stopped by the SMI command.

In step 35, the CPU 100 identifies the type of operating system. The procedure proceeds to step 361 if the operating system is Microsoft Windows 98 or ME, and proceeds to step 362 if the operating system is Microsoft Windows 2000 or XP.

In step 361, the scan code from the keyboard 130 is transferred to a hotkey driver identifying a corresponding status value and driving a corresponding device to implement the hotkey function.

In step 362, the embedded controller 1261 identifies a corresponding status value and driving a corresponding device to implement the hotkey function.

However, in the conventional computer system provided with hotkeys, the embedded controller increases the cost and complicates the circuitry of the super I/O controller 126. Further, the ASL code must be adapted to the embedded controller, which is troublesome in ASL coding.

SUMMARY OF THE INVENTION

The present invention provides a computer system capable of implementing hotkey functions.

The present invention provides a method for implementing functions of hotkeys in a computer having a BIOS and operating system, the method comprising the steps of asserting a system management interrupt signal when a system management interrupt event is detected, determining whether the system management interrupt event results from one of the hotkeys being pressed, determining whether the operating system is of a first or second type if the system management interrupt event results from one of the hotkey being pressed, reading a status value corresponding to the pressed hotkey and implementing one of the functions corresponding to the status value by the BIOS if the operating system is of the first type, and reading the status value corresponding to the pressed hotkey and transferring the status value to the operating system by the BIOS, and implementing one of the functions corresponding to the status value by the operating system if the operating system is of the second type.

The present invention further provides a computer capable of implementing the functions of hotkeys comprising a memory device storing an operating system, a BIOS storing program codes and status values, a keyboard having a first and second key, and asserting a first and second key press signal when the first and second keys are pressed respectively, a bridge device asserting an interrupt signal representing a hotkey event when the first and second key press signal are asserted simultaneously, and a CPU loaded with the operating system, and when the interrupt signal is asserted, reading the program codes in the BIOS to implement the steps of asserting an SMI signal, determining whether the interrupt signal results from the hotkey event, determining whether the operating system is of a first or second type if the interrupt signal results from the hotkey event, reading one of the status values corresponding to the hotkey event and implementing one of the functions corresponding to the read status value by the BIOS if the operating system is of the first type, and reading one of the status values corresponding to the hotkey event and transferring the read status value to the operating system by the BIOS, and implementing one of the functions corresponding to the read status value by the operating system if the operating system is of the second type.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
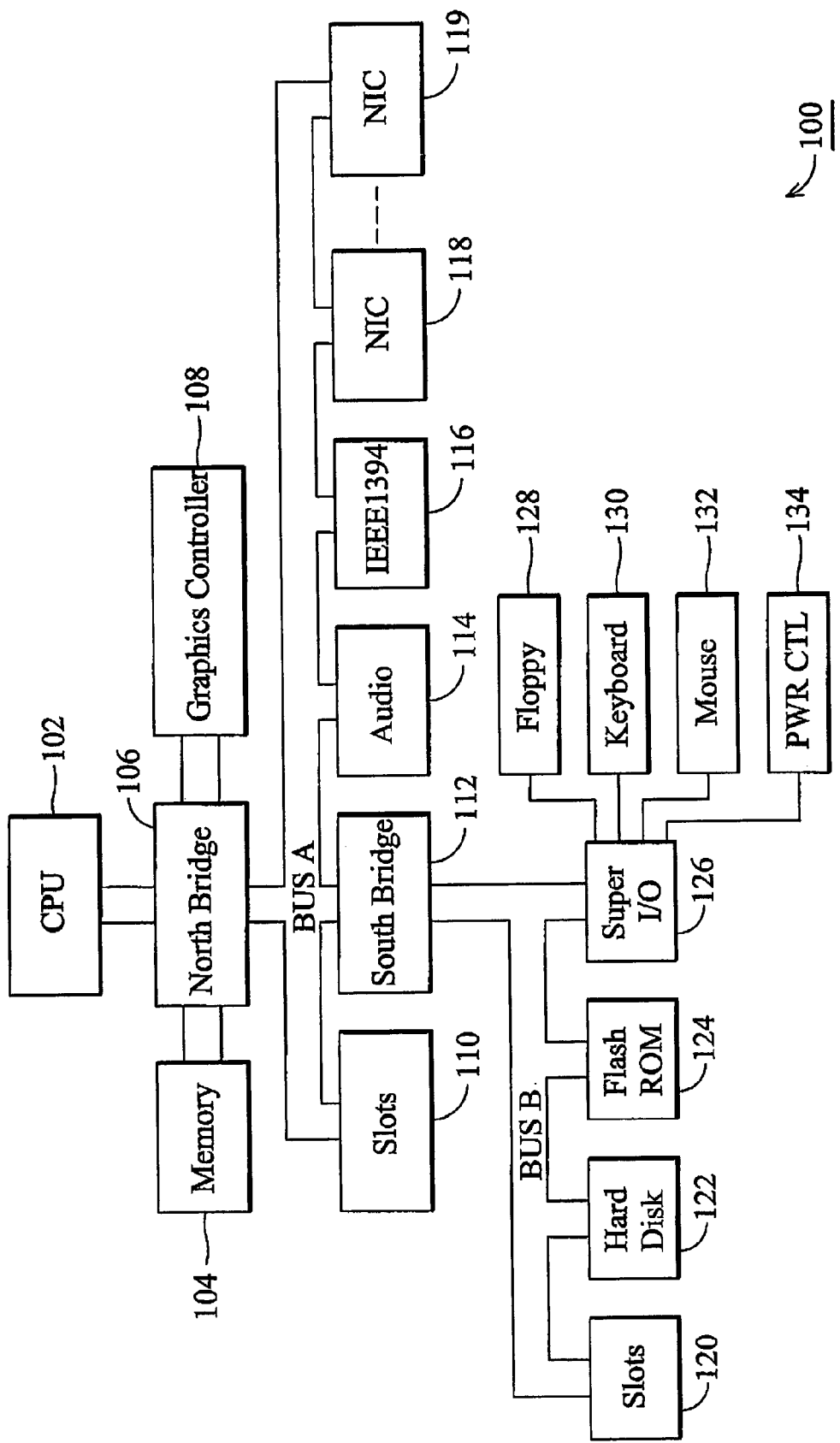
FIG. 1 is a diagram showing a conventional computer system provided with hotkeys.
Figure 2:
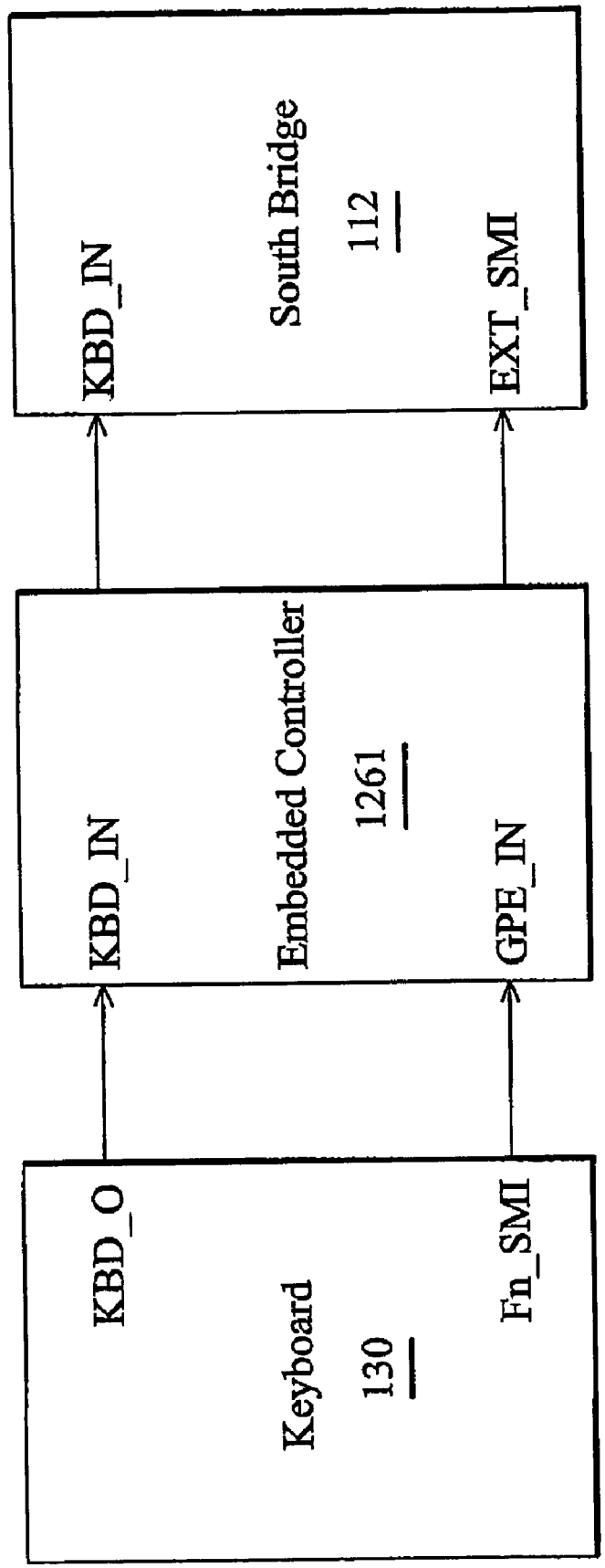
FIG. 2 shows a conventional embedded controller.
Figure 3:
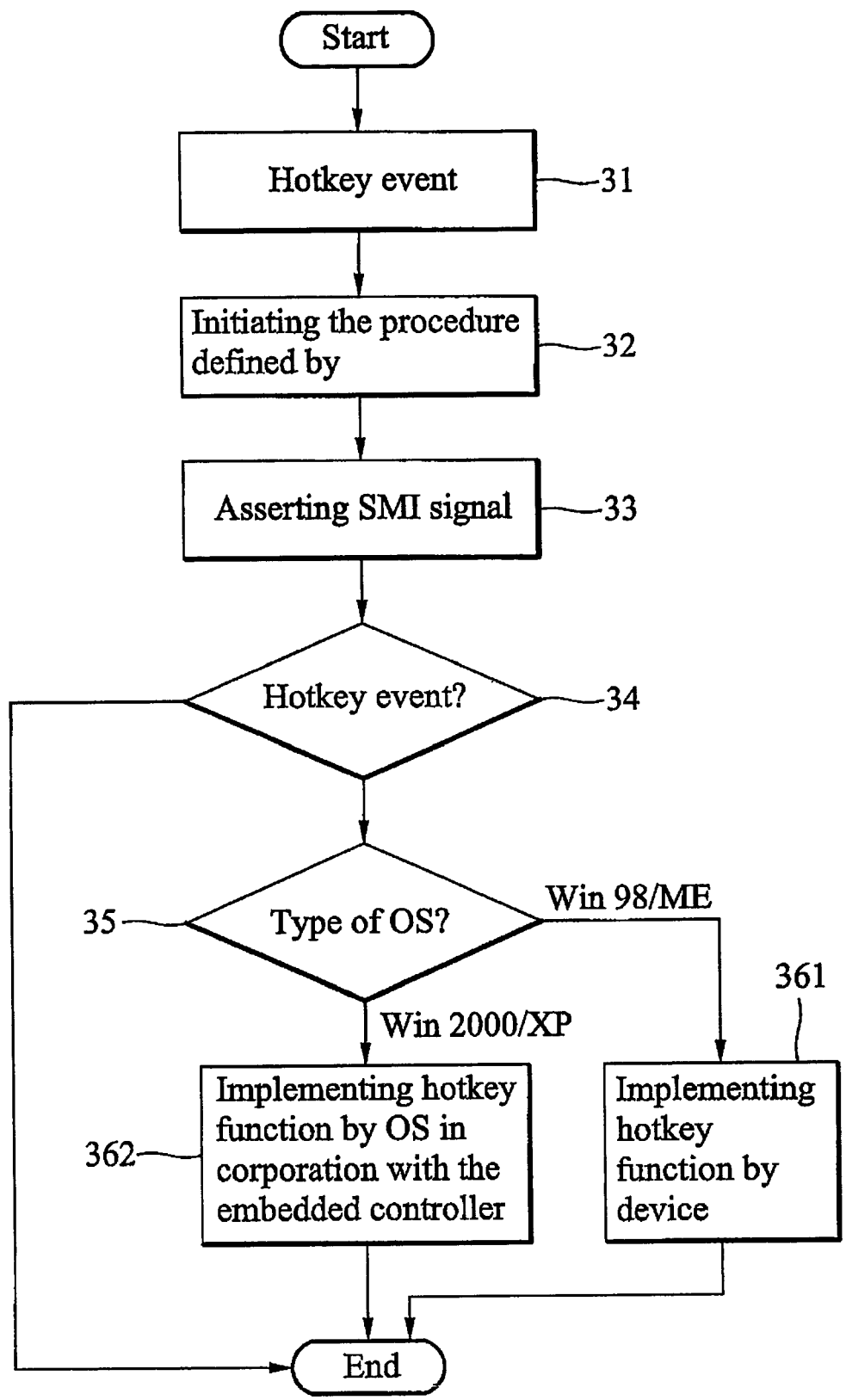
FIG. 3 is a flowchart of a conventional method for implementing hotkey functions in a computer.
Figure 4:
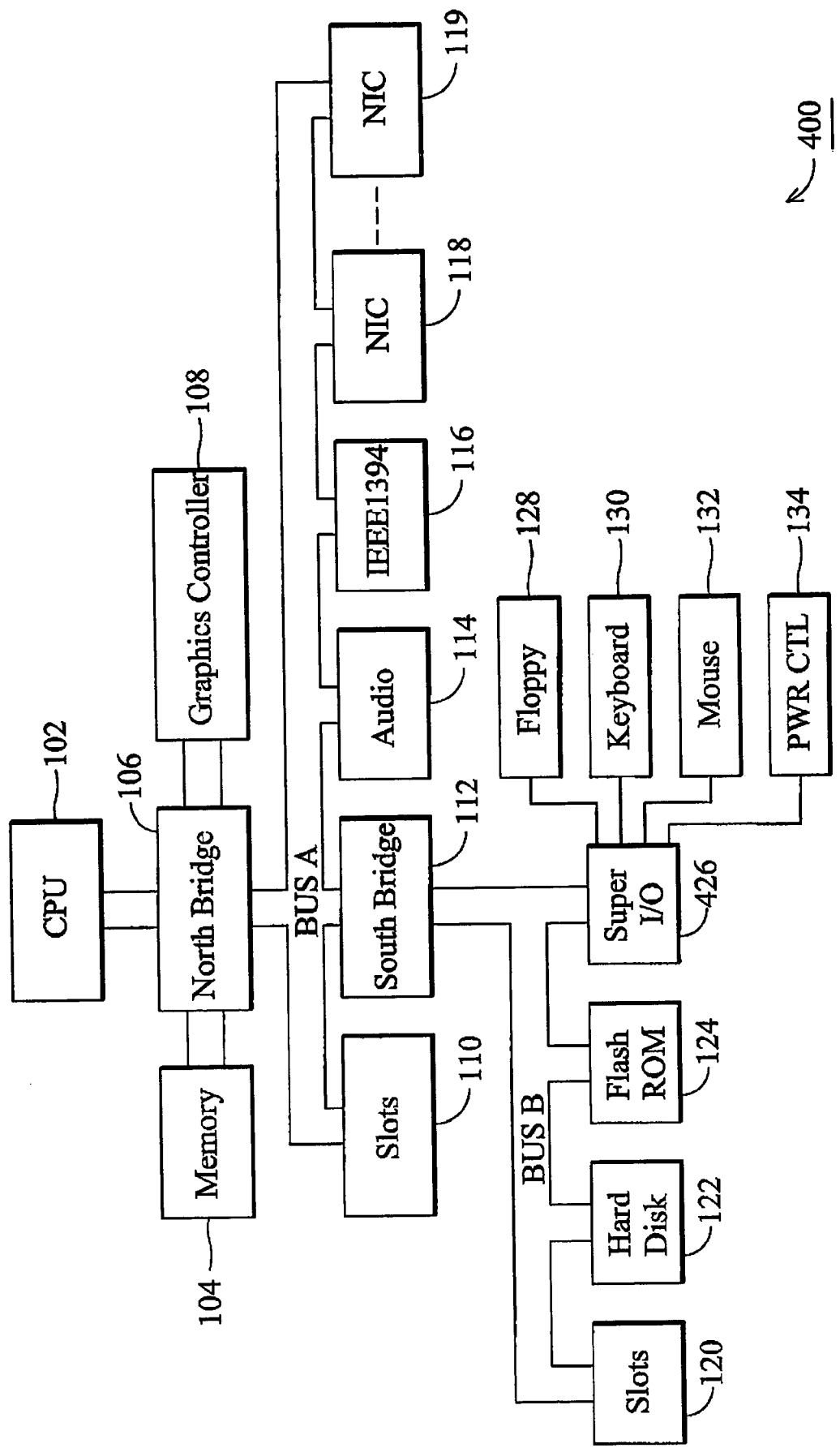
FIG. 4 is a diagram showing a computer capable of implementing functions of hotkeys according to one embodiment of the invention.

FIG. 4 is a diagram showing a computer capable of implementing functions of hotkeys according to one embodiment of the invention. It is similar to that shown in FIG. 1 except that the I/O controller does not include an embedded controller. For example, when the keys Fn and F2 are pressed together, the keyboard 130 sends directly to the south bridge 112 a corresponding scan code and a signal representing an interrupt event through the output terminals KBD_O and Fn_SMI respectively, by which the CPU 100 loads the ASL code from the BIOS initiating the procedure for the hotkey function.

Figure 5:
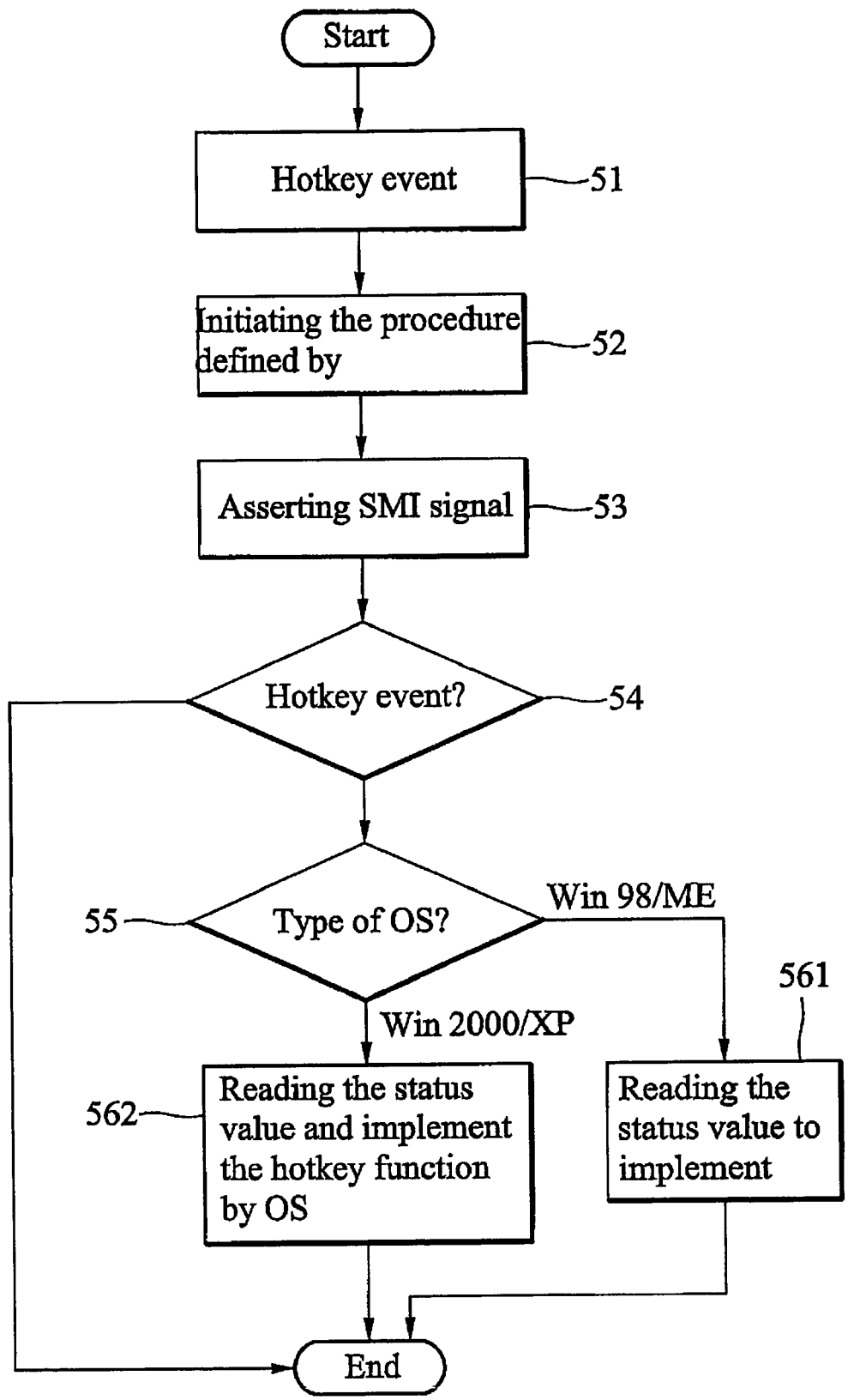
FIG. 5 is a flowchart of a method for implementing functions of hotkeys in a computer according to one embodiment of the invention.

FIG. 5 is a flowchart of a method for implementing functions of hotkeys in a computer according to one embodiment of the invention.

In step 51, the keys Fn and F2 are pressed together so that a hotkey event occurs. The keyboard accordingly sends out corresponding scan codes and asserts a signal representing an interrupt event.

In step 52, the operating system stored in the hard disk 122 has been loaded into the CPU 100. The signal representing the interrupt event from the keyboard 130 results in an SMI command sent to the CPU 100, which temporarily stops all procedures currently implemented by the operating system.

In step 53, the CPU 100 loads the ASL code from the BIOS and accordingly implements the following steps.

In step 54, the CPU 100 determines whether the interrupt event is a hotkey event. If so, the procedure proceeds to step 55; otherwise, the procedure of the ASL code is terminated and the CPU 100 returns to continue the procedures of the operating system previously stopped by the SMI command.

In step 55, the CPU 100 identifies the type of the operating system. The procedure proceeds to step 561 if the operating system is Microsoft Windows 98 or ME, and proceeds to step 562 if the operating system is Microsoft Windows 2000 or XP.

In step 561, the CPU 100 reads the scan code from the keyboard 130 identifies a corresponding status value stored in the BIOS, transfers the status value to a corresponding driving device implementing the hotkey function.

In step 562, the CPU 100 reads the scan code from the keyboard 130 identifies a corresponding status value stored in the BIOS, transfers the status value to the operating system to drive a corresponding device implementing the hotkey function.

In conclusion, the present invention provides a computer system capable of implementing hotkey functions without using an embedded controller. The ASL code stored in the BIOS, instead of an embedded controller, identifies hotkey events and initiates the procedure for implementing hotkey functions, which eliminates the need for a hotkey driver, the additional cost and circuit complexity resulting from the embedded controller, and simplifies the ASL coding.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for implementing functions of hotkeys in a computer having a BIOS and operating system, the method comprising the steps of:

asserting a system management interrupt signal when a system management interrupt event is detected;

determining whether the system management interrupt event results from one of the hotkeys being pressed;

determining whether the operating system is of a first or second type if the system management interrupt event results from one of the hotkeys being pressed;

reading a status value corresponding to the pressed hotkey from the BIOS, and transferring the read status value to a corresponding driving device implementing one of a plurality of hotkey functions if the operating system is of the first type; and reading the status value corresponding to the pressed hotkey from the BIOS, and transferring the read status value to the operating system to drive a corresponding device implementing one of a plurality of hotkey functions if the operating system is of the second type.

2. The method as claimed in claim 1, wherein the computer has a first and second key, and in the event that one of the hotkeys is pressed, detects when the first and second keys are pressed simultaneously.

3. The method as claimed in claim 2, wherein the first key is a key Fn and the second key is one of keys F1~12.

4. The method as claimed in claim 1, wherein the operating system of the first type is Microsoft Windows 98.

5. The method as claimed in claim 1, wherein the operating system of the first type is Microsoft Windows ME.

6. The method as claimed in claim 1, wherein the operating system of the second type is Microsoft Windows 2000.

7. The method as claimed in claim 1, wherein the operating system of the second type is Microsoft Windows XP.

8. The method as claimed in claim 1, wherein one of the functions of the hotkeys is display switching.

9. The method as claimed in claim 8, wherein the status value is transferred to a video BIOS of the computer for display switching.

10. A computer capable of implementing functions of hotkeys comprising:
a memory device storing an operating system;
a BIOS storing program codes and status values;
a keyboard having a first and a second key, and asserting a first and second key press signal when the first and second keys are pressed respectively;
a bridge device asserting an interrupt signal representing a hotkey event when the first and second key press signals are asserted simultaneously; and
a CPU loaded with the operating system, and when the interrupt signal is asserted, reading the program codes in the BIOS to implement the steps of:
asserting an SMI signal;
determining whether the interrupt signal results from the hotkey event;
determining whether the operating system is of a first or second type if the interrupt signal results from the hotkey event;
reading one of the status values corresponding to the hotkey event from the BIOS, and transferring the read status value to a corresponding driving device implementing one of a plurality of hotkey functions if the operating system is of the first type; and
reading one of the status values corresponding to the hotkey event from the BIOS, and transferring the read status value to the operating system to drive a corresponding device implementing one of a plurality of hotkey functions if the operating system is of the second type.

11. The computer as claimed in claim 10, wherein the first key is a key Fn and the second key is one of the keys F1~F2.

12. The computer as claimed in claim 10, wherein the operating system of the first type is Microsoft Windows 98.

13. The computer as claimed in claim 10, wherein the operating system of the first type is Microsoft Windows ME.

14. The computer as claimed in claim 10, wherein the operating system of the second type is Microsoft Windows 2000.

15. The computer as claimed in claim 10, wherein the operating system of the second type is Microsoft Windows XP.

16. The computer as claimed in claim 10, wherein one of the functions of the hotkeys is display switching.

17. The computer as claimed in claim 16, wherein the status value is transferred to a video BIOS of the computer for display switching.

18. The computer as claimed in claim 10, wherein the memory device is a hard disk.

19. The computer as claimed in claim 10, wherein the BIOS has a ROM storing the program codes and status values.

20. The computer as claimed in claim 10, wherein the program codes are ASL codes.

* * * * *